US008629376B2

(12) United States Patent
Palla et al.

(10) Patent No.: US 8,629,376 B2
(45) Date of Patent: Jan. 14, 2014

(54) MULTIMOUNT OVEN RACK

(75) Inventors: Srinivasa Palla, Hyderabad (IN); Philip Barber, Louisville, KY (US); Michael Gallant, Ooltewah, TN (US); Jonathan Sprigler, Louisville, KY (US)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 13/182,979

(22) Filed: Jul. 14, 2011

(65) Prior Publication Data

US 2013/0014741 A1    Jan. 17, 2013

(51) Int. Cl.
*F27D 5/00* (2006.01)
*F24C 15/00* (2006.01)

(52) U.S. Cl.
USPC .......... 219/392; 219/390; 219/391; 126/19 R; 126/337 R; 126/339; 126/215; 126/333; 99/450

(58) Field of Classification Search
USPC ............ 219/390–392; 126/19 R, 337 R, 339, 126/215, 333, 337 A; 99/450
See application file for complete search history.

(56) References Cited

U.S. PATENT DOCUMENTS 6,945,245 B1    9/2005 Wilson
2005/0217500 A1 * 10/2005 Dunn ............................. 99/450

* cited by examiner

*Primary Examiner* — Shawntina Fuqua
(74) *Attorney, Agent, or Firm* — Fay Sharpe LLP

(57) ABSTRACT

An oven rack is received in an oven above a lower surface of the chamber and having a bake element mounted in the chamber either above or below the lower surface. The oven rack is configured to support cooking ware on one of the lower surface of the oven chamber or on rack shelf portions provided in sidewalls of the chamber. The rack includes a first portion having a substantially planar top surface, a second portion having a substantially planar lower surface spaced from the top surface and it is also configured to support the rack in one of the rack shelf portions or on the lower surface of the oven chamber. First and second walls extend between these first and second portions whereby the walls have a first dimension slightly greater than a height from the bottom surface of the oven chamber to a top of the bake element when the bake element is mounted above the lower surface.

20 Claims, 4 Drawing Sheets

MULTIMOUNT OVEN RACK

BACKGROUND OF THE DISCLOSURE

The present disclosure relates to an oven, and particularly a baking oven that employs an oven rack that may be used both on rack guides/supporting sidewall shelf portions and also placed on a bottom surface of the oven chamber. It will be appreciated, however, that the disclosure may find application in related environments and applications.

Consumers like the flexibility offered by oven racks that can be mounted at different heights or locations within an oven chamber. That is, the oven chamber is typically a substantially cubical volume defined by a first or lower surface spaced from a second or upper surface, a pair of generally parallel sidewalls interconnecting the upper and lower surfaces, a rear wall, and a door that closes the front of the oven chamber and provides for selective access to the oven chamber. The door often includes a window so that the user can view the oven chamber through at least a portion of the door.

A typical oven design includes a series of die grooves or shelf portions integrally formed in the sidewalls so that one or more racks may be supported along opposite side edges by the shelf portions at various heights in the oven chamber. By way of example only, it is common to have two (2) or more shelf portions on each sidewall to allow one or more shelves or racks to be located at different heights within the oven chamber.

The bake element is sometimes hidden, i.e., disposed beneath the bottom surface of the oven chamber, while in other instances the bake element is mounted above the lower surface and exposed in the oven chamber. In this latter situation, the lowermost shelf position is still located at a predetermined height above the bake element so that a rack supported along opposite edges by the shelf portions is situated above the bake element. However, there is an increased desire to maximize the usable space or volume of the oven chamber. Likewise, there is a desire to use existing components in a variety of ways to maximize the flexibility for the user.

Consequently, a need exists for an oven rack that can be installed on one of the multiple oven rack guides or shelf portions and alternatively be placed on the bottom surface of the oven chamber or oven cavity to maximize usable space, eliminate interference with the door and other components, and provide for flexibility and multiple options for the user.

SUMMARY OF THE DISCLOSURE

An oven rack used in an associated oven having a bake element mounted either above or below a lower surface in an oven chamber is supported on one of the lower surface of the oven or the rack shelf portions provided in the sidewalls of the oven chamber. The oven rack preferably includes a first portion having a substantially planar top surface. A second portion has a substantially planar lower surface spaced from the top surface for selective receipt in one of the rack shelf portions or on the lower surface of the oven chamber. First and second walls interconnect the first and second portions and have a first dimension slightly greater than a second dimension defined by a height from the bottom surface of the oven chamber to the top of the bake element when the bake element is mounted above the lower surface.

In a preferred arrangement, the first portion includes a series of spaced wire rods that form the top surface, and a series of cross bars that extend substantially perpendicular and in supporting relation to the wire rods.

In a preferred arrangement, the opposite end regions of the cross bars form the walls that interconnect the first and second portions.

Preferably, at least two of the crossbars connect lower portions of the walls to form first and second side edges.

A stop member may be provided on the oven rack to cooperate with a second stop member of the oven chamber to limit movement of the rack when installed in the oven chamber. Likewise, an anti-tilt member may be provided on the rack and configured to cooperate with a second anti-tilt member provided in the oven chamber to limit tilt of the oven rack relative to the chamber when installed on one of the shelf portions.

Use of the oven rack in an oven that includes a cooking chamber formed by a bottom surface having a bake element mounted either above or below the bottom surface, and first and second sidewalls extending from a rear wall where the sidewalls each include shelf portions configured to receive the oven rack is disclosed.

The present disclosure allows the multimount rack to be placed directly on the bottom surface of the oven chamber or on one of the rack shelf portions.

The disclosure also eliminates any interference problem of the rack with the door or other components of the oven when received in the oven chamber.

Yet another benefit resides in the increased usable space within the oven chamber since cooking ware with an increased height can be accommodated in the oven chamber.

Still other features and benefits of the present disclosure will become apparent upon reading and understanding the following detailed description.

DETAILED DESCRIPTION OF THE PREFERRED EMBODIMENTS

Figure 1:
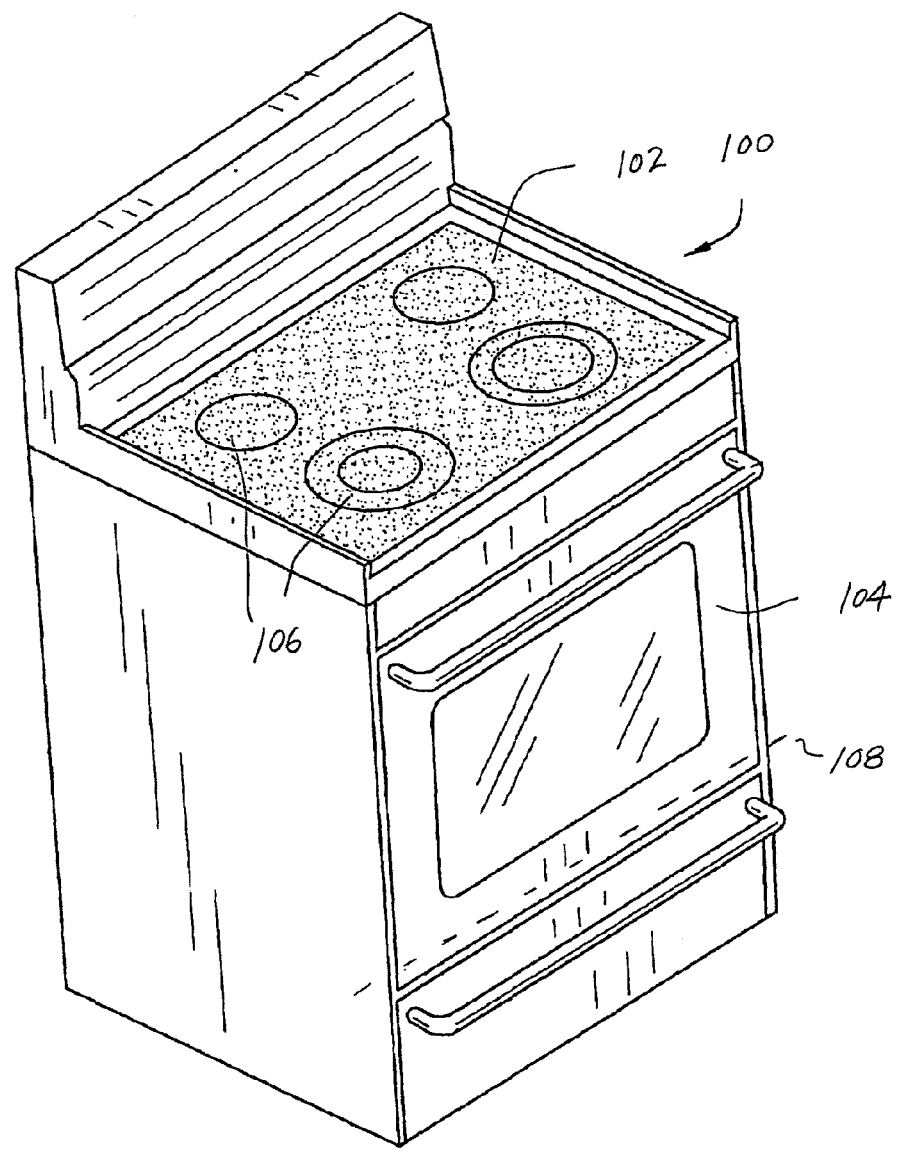
FIG. 1 is a perspective view of an oven including an oven chamber for receiving an oven rack.

Turning initially to FIG. 1, an oven 100 is shown and preferably includes a top surface 102 and a front door 104. The top surface may or may not include surface cooking elements or burners 106, but in many applications the top surface 102 is also a cooking surface (e.g., one or more individual burners are provided in or on the top surface). The door 104 is pivotable about a horizontal hinge 108 so that by grasping handle 110, the door may be opened and closed to provide selective access to cooking chamber 120, a portion of which is shown in FIG. 2.

Figure 2:
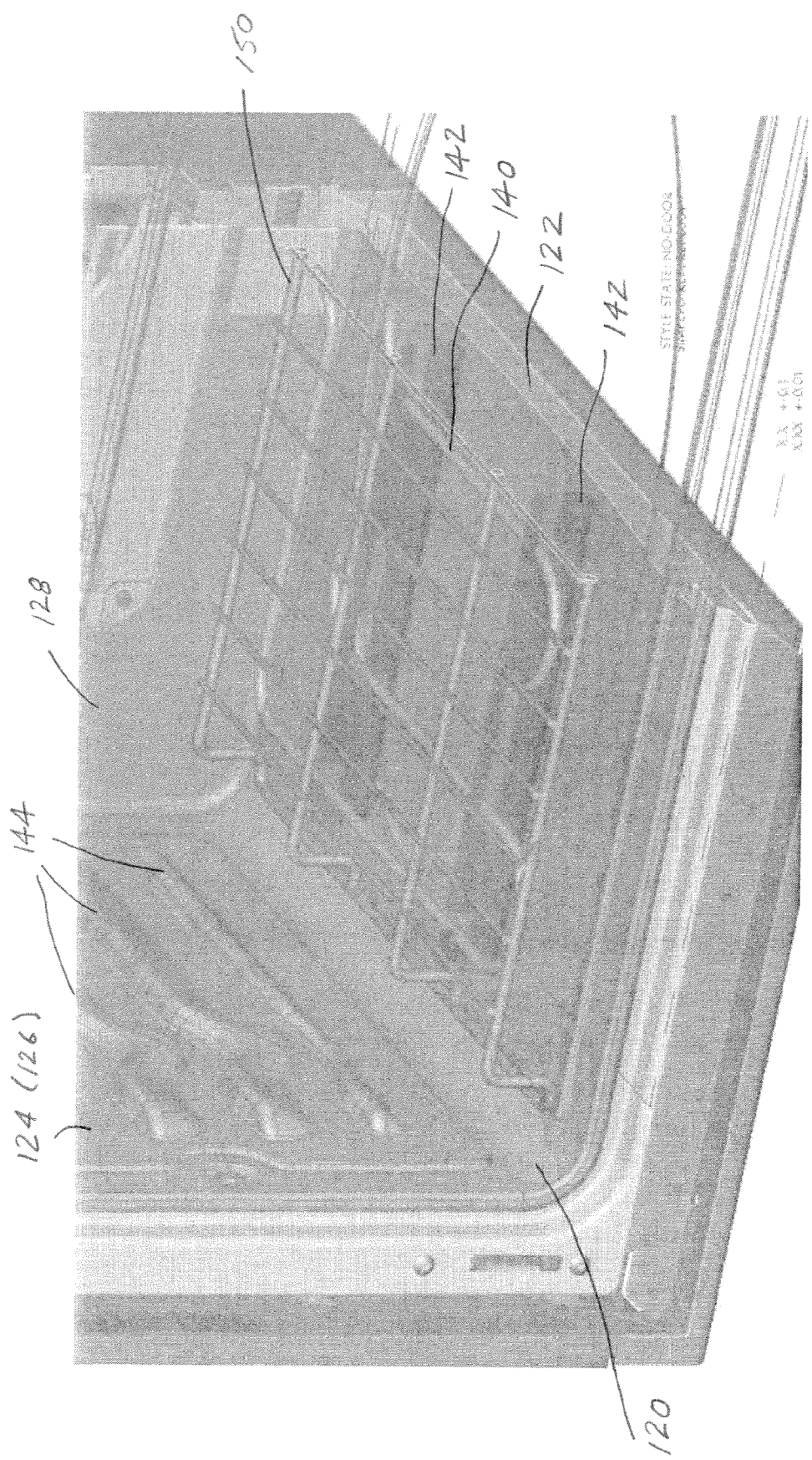
FIG. 2 is a perspective view of a portion of an oven chamber with the door removed with the multimount oven rack seated directly on a lower surface of the oven chamber.
Figure 4:
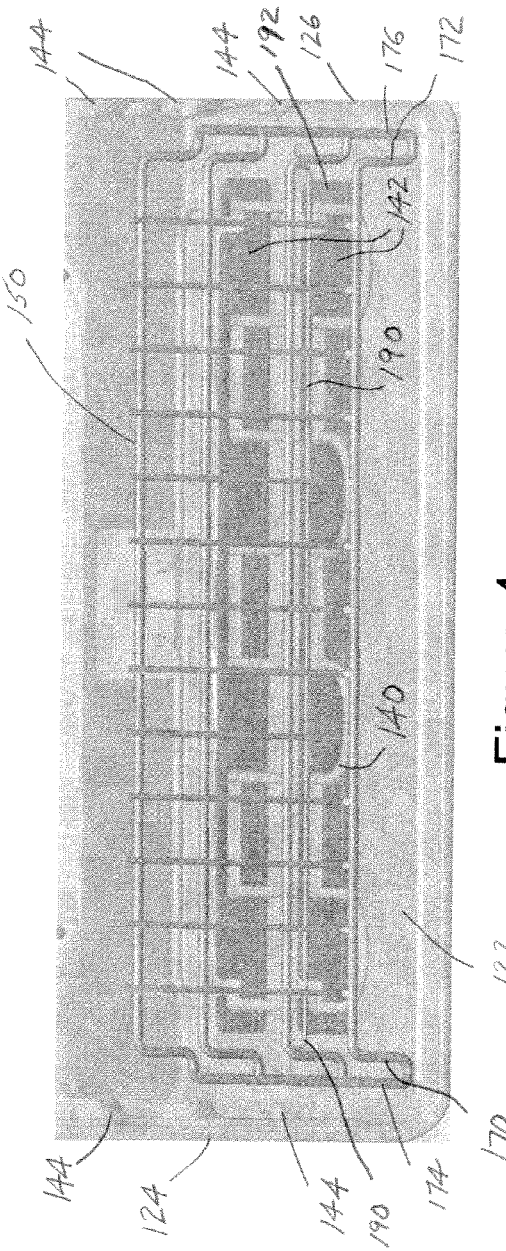
FIG. 4 is a perspective view into the oven chamber and directed toward the lower surface showing the rack of FIG. 3 mounted on the lower surface of the oven chamber.

The oven cavity or cooking chamber 120 is a generally cubical volume defined by the door 104, lower surface 122, first and second sidewalls 124, 126, a rear wall 128, and an upper wall or surface (not shown, and on which may be mounted a broiler cooking element) (FIGS. 2 and 4). In the illustrated embodiments, a bake element or calrod 140 is received in the oven chamber 120. It is common to include one or more supports 142 that support the bake element in a generally horizontal position above the lower surface 122 (a non-hidden bake oven), or alternatively the bake element is mounted below the bottom surface (a hidden bake oven). In addition, the sidewalls 124, 126 typically include shelf portions or rack guides 144 integrally formed in the sidewalls and that allow oven racks to be supported at different heights within the oven chamber 120. Generally, these shelf portions are unchanged when used with the new oven rack(s) of the present disclosure.

Figure 3:
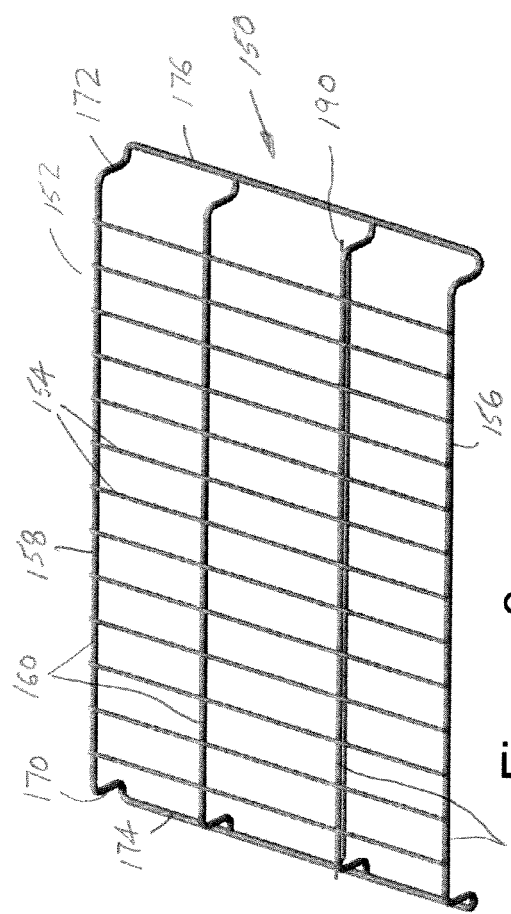
FIG. 3 is a perspective view of a first preferred embodiment of the multimount oven rack.

A multimount oven rack 150 of the present disclosure is individually illustrated in FIG. 3. The oven rack 150 includes a first portion that forms a generally planar top surface 152. In the preferred embodiment, and as is common with conventional oven racks, the preferred material of construction is a series of spaced wire rods 154 that in this arrangement extend in substantially parallel relation from a front edge 156 to a rear edge 158. Together, the wire rods 154 form the substantially planar top surface 152. Further, the wire rods 154 are supported at spaced locations by transversely extending wire rods or crossbars 160. In the preferred arrangement, the outermost crossbars 160 are located at the front and rear edges 156, 158 of the rack 150. In addition, opposite ends of the crossbars 160 are configured (i.e., bent through approximately a ninety degree turn) to form first and second walls 170, 172. In the preferred arrangement, the end regions of the crossbars 160 are turned downwardly and interconnect the top surface 152 with second portions 174, 176 (formed by bending the wire rods of the crossbars 160 through a second, approximately ninety degree turn to form stepped edges of the rack 150) defining the opposite side edges. The second portions or side edges 174, 176 define a generally planar lower surface 178 at a height below that of the substantially planar top surface 152. That is, the height defined by the first and second walls 170, 172 (between the upper and lower surfaces 152, 178) is slightly greater than a dimension or height measured from lower surface 122 of the oven chamber to an upper surface of the bake element 140. In this manner, when the oven rack 150 is positioned for support on the lower surface 122 of the oven chamber, the planar top surface 152 of the rack 150 is located or positioned slightly above the bake element 140 in the non-hidden bake oven. However, the planar top surface 152 is closely spaced to the bake element 140 and thereby maximizes usable space within the oven chamber, i.e., cooking utensils of slightly greater height can then be accommodated when the oven rack 150 is positioned on the lower surface 122 of the oven chamber. Alternatively, the top surface 152 is likewise spaced a preselected height above the bottom surface when supported on the lower surface in the hidden bake oven (i.e., when the bake element is mounted below the bottom surface) and this preselected height is minimized in order to maximize the usable space in the oven chamber. Thus, it is apparent that this multimount oven rack is sufficiently versatile for use in both hidden and non-hidden bake ovens without having to alter the structure of the oven rack.

A stop member 190 preferably extends from the oven rack. In this particular instance, the stop member 190 is formed by a wire rod that is mounted below one of the crossbars and extends across a substantial width of the rack 150. The stop member 190 is positioned at a height where the stop member is designed to contact a second stop member 192. In this particular instance, the second stop member 192 is one of the plural supports 142 that supports the bake element. In this manner, front to back movement of the rack 150 when installed on the lower surface 122 is limited.

One skilled in the art will appreciate that the width of the new oven rack 150 is dimensioned to extend across substantially the entirety of the width of the oven chamber. In this manner, multiple cooking ware such as pots, pans, roasters, dishes, sheets, etc., can be accommodated across the width of the oven chamber and supported on the oven rack 150, and likewise the rack positions the cook ware close to the lower surface so that cook ware of increased height can be accommodated in the oven chamber.

Figure 5:
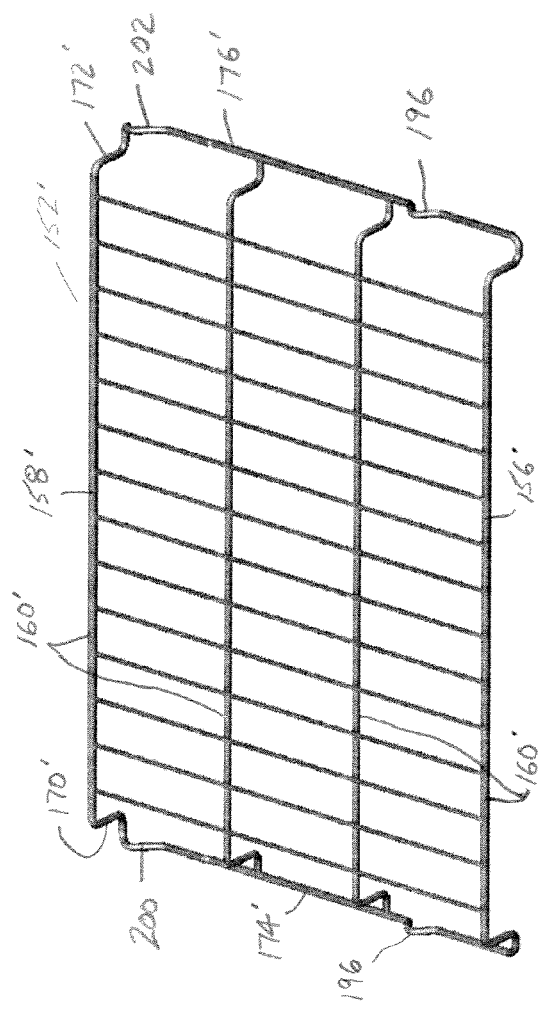
FIG. 5 is a perspective view of a second preferred embodiment of an oven rack.
Figure 6:
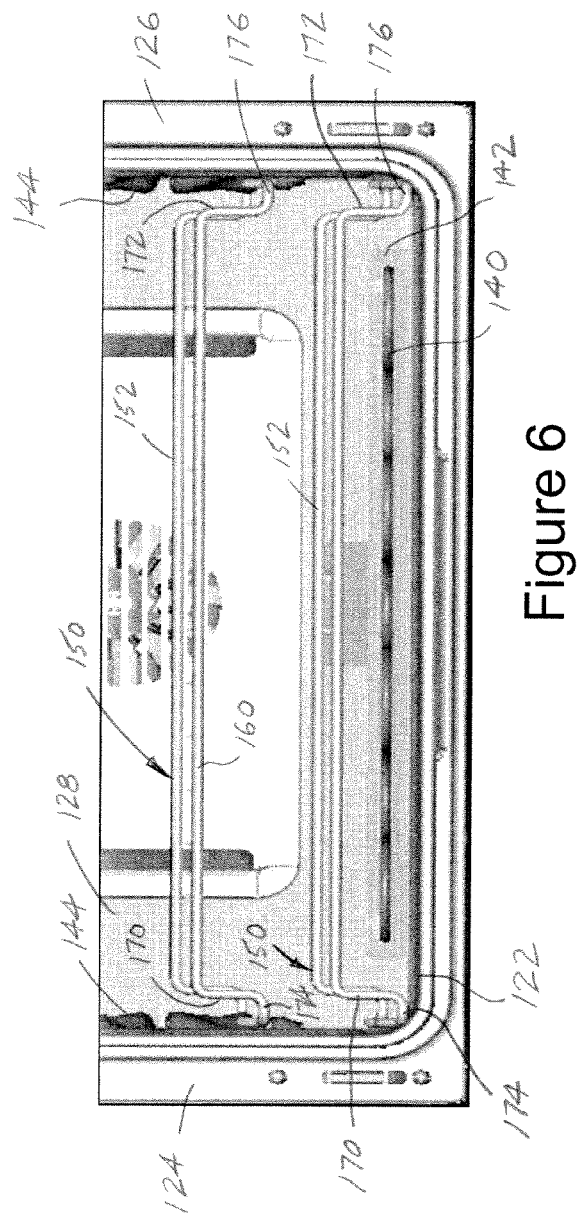
FIG. 6 shows two of the racks of FIG. 5 mounted in an oven chamber.

Shown in FIG. 5 is a second preferred embodiment of the oven rack so that like reference numerals will refer to like components while new numerals will refer to new components. The rack 150' is substantially identical but includes stop member 196 provided in each of the first and second side edges 174', 176'. These stop members 196 cooperate with stop member 198 in the sidewall configuration of the shelf portions and limit front to back movement of the rack when installed along the shelf portions Likewise, anti-tilt members 200, 202 are also provided in the side edges 174', 176' to limit tilt of the oven rack when the rack is installed along the shelf portions in a manner generally known in the art. As best exemplified in FIG. 6, the wire racks can be configured in this manner for use in a selective manner in one of the shelf portions, or to be seated directly on the lower surface of the oven chamber.

The disclosure has been described with respect to preferred embodiments. Obviously, modifications and alterations may be contemplated by one skilled in the art, and the subject disclosure should not be limited to the particular examples described above but instead through the following claims.

What is claimed is:

1. An oven rack for use in an associated oven having a bake element mounted above a lower surface of an oven chamber by supporting the oven rack on one of the lower surface of the oven chamber or rack shelf portions provided in sidewalls of the oven chamber, the oven rack comprising:
a first portion having a substantially planar top surface;
a second portion having a substantially planar lower surface spaced from the top surface and configured to support the rack on one of the rack shelf portions or the lower surface of the oven chamber such that the substantially planar top surface of the first portion is located above the substantially planar lower surface of the second postion; and
first and second walls extending between the first and second portions, the walls having a first dimension slightly greater than a second dimension defined by a height from the bottom surface to a top of the bake element.

2. The oven rack of claim 1 wherein the first portion includes a series of spaced wire rods that form the top surface.

3. The oven rack of claim 2 further comprising a series of cross bars that extend substantially perpendicular and in supporting relation to the wire rods.

4. The oven rack of claim 3 wherein opposite end regions of the cross bars form the walls.

5. The oven rack of claim 4 wherein at least first and second cross bars connect with lower portions of the walls to form first and second side edges.

6. The oven rack of claim 5 wherein the lower portions and side edges are configured to operatively cooperate with the rack shelf portions provided in the first and second sidewalls of the oven chamber.

7. The oven rack of claim 1 further comprising a first stop member that is configured to operatively cooperate with a second stop member in the oven chamber of the associated oven.

8. The oven rack of claim 7 further comprising a first anti-tilt member that is configured to operatively cooperate with a second anti-tilt member provided in the oven chamber.

9. The oven rack of claim 7 wherein the first stop member extends outwardly for selective engagement with a baking element support member.

10. The oven rack of claim 7 wherein the first stop member extends outwardly for selective engagement with the second stop member located on one of the sidewalls.

11. An oven comprising:
  a cooking chamber formed by at least a bottom surface having a bake element mounted thereon, and first and second sidewalls extending from a rear wall, the sidewalls including shelf portions;
  an oven rack configured for receipt between the sidewalls at different optional heights when supported by one of the shelf portions or for support on the bottom surface in overlying relationship with the bake element, the oven rack including:
    a first portion having a substantially planar top surface;
    a second portion having a substantially planar lower surface spaced from the top surface and configured to support the rack on one of the rack shelf portions or the lower surface of the oven chamber such that the substantially planar top surface of the first portion is located above the substantially planar lower surface of the second position; and
    first and second walls extending between the first and second portions, the walls having a first dimension slightly greater than a second dimension defined by a height from the bottom surface of the cooking chamber to a top of the bake element so that the substantially planar top surface is located above the bake element when the rack is supported on the lower surface of the oven chamber.

12. The oven rack of claim 11 wherein the first portion includes a series of spaced wire rods that form the top surface.

13. The oven rack of claim 12 further comprising a series of cross bars that extend substantially perpendicular and in supporting relation to the wire rods.

14. The oven rack of claim 13 wherein opposite end regions of the cross bars form the walls.

15. The oven rack of claim 14 wherein at least first and second cross bars connect with lower portions of the walls to form first and second side edges.

16. The oven rack of claim 15 wherein the lower portions and side edges are configured to operatively cooperate with the rack shelf portions provided in the first and second sidewalls of the oven chamber.

17. The oven rack of claim 11 further comprising a first stop member that is configured to operatively cooperate with a second stop member in the oven chamber of the associated oven.

18. The oven rack of claim 17 further comprising a first anti-tilt member that is configured to operatively cooperate with a second anti-tilt member provided in the oven chamber.

19. The oven rack of claim 17 wherein the first stop member extends outwardly for selective engagement with a baking element support member.

20. The oven rack of claim 17 wherein the first stop member extends outwardly for selective engagement with the second stop member located on one of the sidewalls.

* * * * *